US007054821B1

(12) United States Patent
Rosenthal et al.

(10) Patent No.: US 7,054,821 B1
(45) Date of Patent: May 30, 2006

(54) SYSTEM AND METHOD FOR MODELING SKILLS

(75) Inventors: Kathryn A. Rosenthal, Beaconsfield (GB); Andrew J. Berner, Irving, TX (US)

(73) Assignee: Electronic Data Systems Corporation, Plano, TX (US)

( * ) Notice: Subject to any disclaimer, the term of this patent is extended or adjusted under 35 U.S.C. 154(b) by 641 days.

(21) Appl. No.: 08/594,563

(22) Filed: Jan. 31, 1996

(51) Int. Cl.
*G60Q 99/00* (2006.01)

(52) U.S. Cl. .......................................... 705/1; 705/11
(58) Field of Classification Search ................ 705/1, 705/7–9, 11; 707/103, 104; 364/578
See application file for complete search history.

(56) References Cited

U.S. PATENT DOCUMENTS

| 5,111,391 | A | * | 5/1992 | Fields et al. .................... 705/9 |
| 5,117,353 | A | * | 5/1992 | Stipanovich et al. .......... 705/11 |
| 5,140,537 | A | * | 8/1992 | Tullis .......................... 364/578 |
| 5,164,897 | A | * | 11/1992 | Clark et al. ..................... 705/1 |
| 5,197,004 | A | * | 3/1993 | Sobotka et al. ................. 705/8 |
| 5,416,694 | A | * | 5/1995 | Parrish et al. .................. 705/8 |
| 5,617,342 | A | * | 4/1997 | Elazouni ...................... 364/578 |
| 5,634,055 | A | * | 5/1997 | Barnewall et al. ........... 707/103 |

OTHER PUBLICATIONS

Mueller, Ruediger, "A 4GL Based Executive Search System," Journal of End User Computing, vol. 5, No. 2, pp. 5-16, Spring 1993.*
Microsoft Press® Computer Dictionary (Third Edition), pp. 403-404, Aug. 1997.*

* cited by examiner

*Primary Examiner*—Susanna M. Diaz
(74) *Attorney, Agent, or Firm*—Baker Botts L.L.P.

(57) ABSTRACT

A system and method for modeling skills includes three main components: a definition of at least one object (40) specifying a subject matter, a definition of at least one action (42) which may be applied to the defined object (40), and a definition of at least one context (48) in which the defined object and action are used. The context may include tool/technique (72), hardware (74), condition (76), industry (78), current and/or past employer (80), and business rationale (82).

52 Claims, 3 Drawing Sheets

SYSTEM AND METHOD FOR MODELING SKILLS

TECHNICAL FIELD OF THE INVENTION

This invention is related in general to the field of computer software systems. More particularly, the invention is related to a system and method for modeling skills.

BACKGROUND OF THE INVENTION

Skills are what make humans a business resource. What skills a person possesses is a primary consideration in many aspects of managing a business operation, including hiring, employee development, succession planning, compensation, performance evaluation, and project management. Therefore, efforts have been made to explore ways to qualify and quantify skills.

Skills cataloging tools currently available are used to scan resumes and pick out certain terms. These cataloging tools then provide and maintain a list of candidates mapped to certain specified tools, deliverables, hardware, software, tasks, techniques, and methods scanned from the resumes. These catalogs may use a number of terms to describe the same skill. For example, to find a C++ object oriented programmer, one must query about "C++," "Visual C++®," "MS Visual C++®," "Borland C++®," "object oriented programming," "object technology," "object oriented systems development," and so on to derive a complete list of candidates. Such tools also do not provide the manner of which the skills have been used or the manner with which the specified skill was acquired. For example, a person may have used the C++ object oriented programming skill to design, write, or maintain software programs, where the different activities may indicate appreciable differences in the level of the skill.

In a large corporation, different departments performing human resources activities often define skills differently. As a result, each department speaks its own language regarding employee skills, and there is not one integrated and standard vocabulary for describing skills. For example, persons may get hired for possessing a specific skill defined one way by human resources, but the managers trying to staff a project may not be able to identify these employees because they use different terminology to define the same skills.

One solution to the problem is to provide an artificial intelligence engine interface in the query process to link all synonymous skills together, such as Resumix® manufactured by Resumix of Santa Clara, Calif. However, although the user is spared of having to provide all synonyms in the query, the relationships between synonymous skills become hidden from the users. The data gathered are thus rendered much less valuable without the engine. Resumix® is primarily used in applicant tracking and applications using the Resumix® engine are not available for other human resources areas.

SUMMARY OF THE INVENTION

Accordingly, there is a need for a system and method for modeling skills that provides an integrated process for all human resources activities.

In accordance with the present invention, a system and method for modeling skills are provided which eliminates or substantially reduces the disadvantages associated with prior systems and methods.

In one aspect of the invention, the system includes three main components: a definition of at least one object specifying a subject matter, a definition of at least one action which may be applied to the defined object, and a definition of at least one context in which the defined object and action are used.

In another aspect of the invention, a method for modeling skills is provided. The method includes the steps of defining an object specifying a subject matter, defining and specifying an action which may be applied to the defined object, and defining and specifying a context in which the defined object and action may be used.

In yet another aspect of the invention, the context may include a combination of tool/technique, hardware, condition, industry, past employer, and business rationale.

BRIEF DESCRIPTION OF THE DRAWINGS

For a better understanding of the present invention, reference may be made to the accompanying drawings, in which.

DETAILED DESCRIPTION OF THE INVENTION

Figure 1:
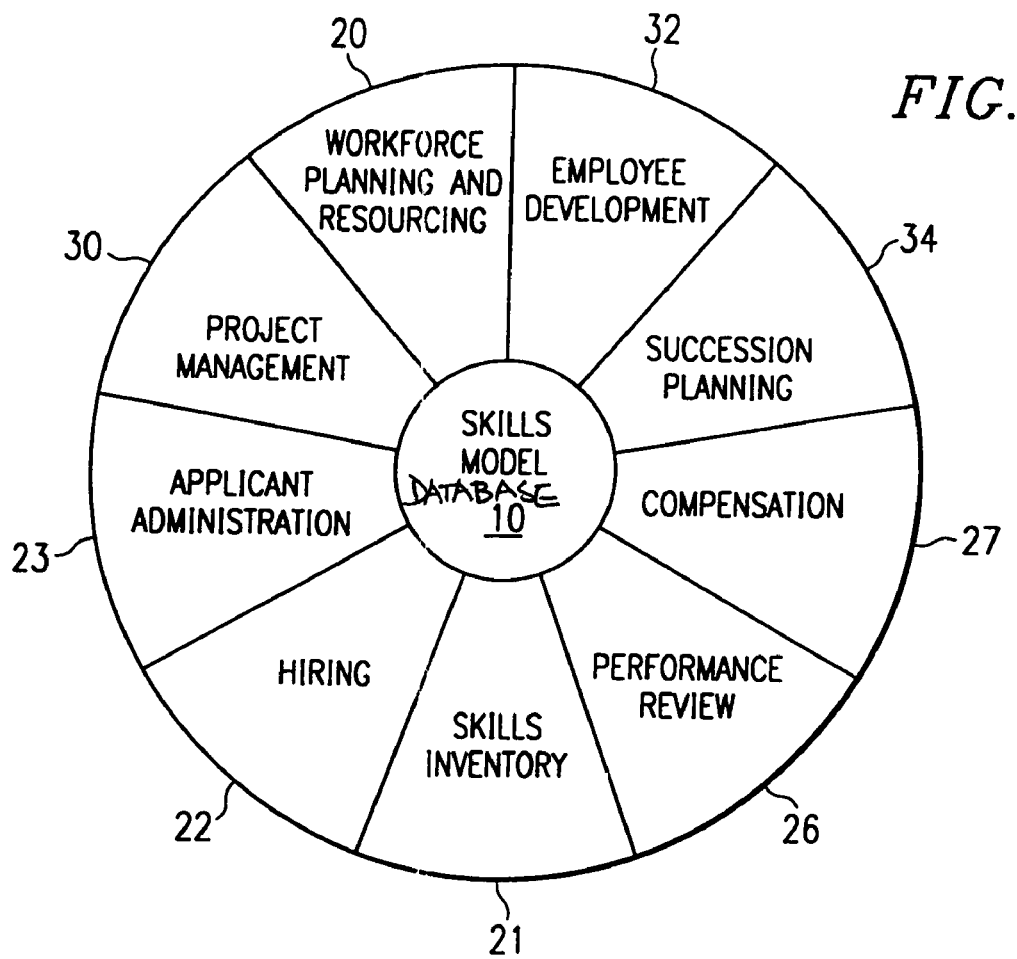
FIG. 1 is a diagram illustrating the broad application of a skills model.
Figure 2:
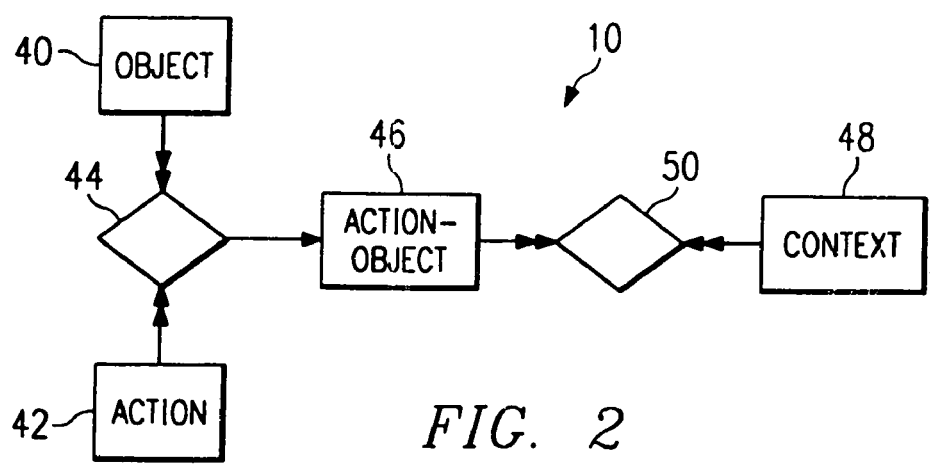
FIG. 2 is a top-level entity/relationship data model of a skills model constructed according to the teachings of the present invention.

The preferred embodiment(s) of the present invention is (are) illustrated in FIGS. 1–3, like reference numerals being used to refer to like and corresponding parts of the various drawings.

FIG. 1 showing the possible areas of application for a database containing a skills model 10. Company personnel may use skills model 10 for workforce planning and resourcing 20, skills inventory 21, hiring 22, and job applicant administration 23. The skills model 10 is also useful in the areas of performance review 26 and compensation 27, so that employees are evaluated and rewarded based on the same pre-defined set of skills they use on their job. In the area of project management 30, the skills model 10 is important in identifying those employees with the skills needed for staffing and completing a project. Similarly in the area of employee development 32, training materials and curricula targeting specific desirable skills may be designed and deployed. Further, in succession planning 34, specific skills in candidates may be identified and matched with the desired set of skills the position requires.

It may be seen that when the definition of the skills agree for each of these applications, the applications mesh more seamlessly because all of these areas are directly or indirectly related with one another. For example, if, upon taking a skills inventory 21 of current employees, it is discovered that a particular skill is lacking, then the job applicant administration and hiring processes 23 and 22 may specify precisely and without ambiguity what skill the ideal candidate should possess. Similarly, a skills inventory 21 may result in the development and training of specific skills in certain employees because they lack the needed skills.

Referring to FIG. 2, a top level entity/relationship diagram or data model of a skills model 10 constructed according to the teachings of the present invention is shown.

Entity/relationship data models are well known in the art of computer software engineering and commonly used to design and document the inter-relationships between objects and processes and specifies the structure and operations for persistent databases. There are existing software programs that are capable of at least partially translating a data model representation into software code.

As shown in FIG. 2, skills model 10 includes an Object entity 40 and an Action entity 42. Object entity 40 is a specific item that is created or a deliverable. Examples of an Object entity 40 include entity/relationship diagram, software, conflict resolution, network HUB, problem solving technique, vision statement, thought leadership, etc. Action entity 42 is used to describe an action that may be applied to an object. For example, Action entity 42 may include design, construct, implement, have knowledge of, effectively use, etc. An action applied to an object yields an Action-Object entity 46, in which the relationship "applies" is indicated by diamond 44. Action-Object entity 46 is a controlled list of the combination of actions and objects representing skills important to the organization. A fourth entity, Context 48, is used to describe and provide additional background information or modifiers for the Action-Object entity 46. The relationship "has" is indicated by diamond 50. Context entity 48 may name, for example, the hardware and software used, specific technology involved, the industry context of where the skill is used, business reasons for using the specific skill, etc. Accordingly, the skill or Action-Object entity 46 is not viewed in a vacuum, but enriched by additional information that are important in applying the skills model to the various human resource and training areas.

Figure 3A:
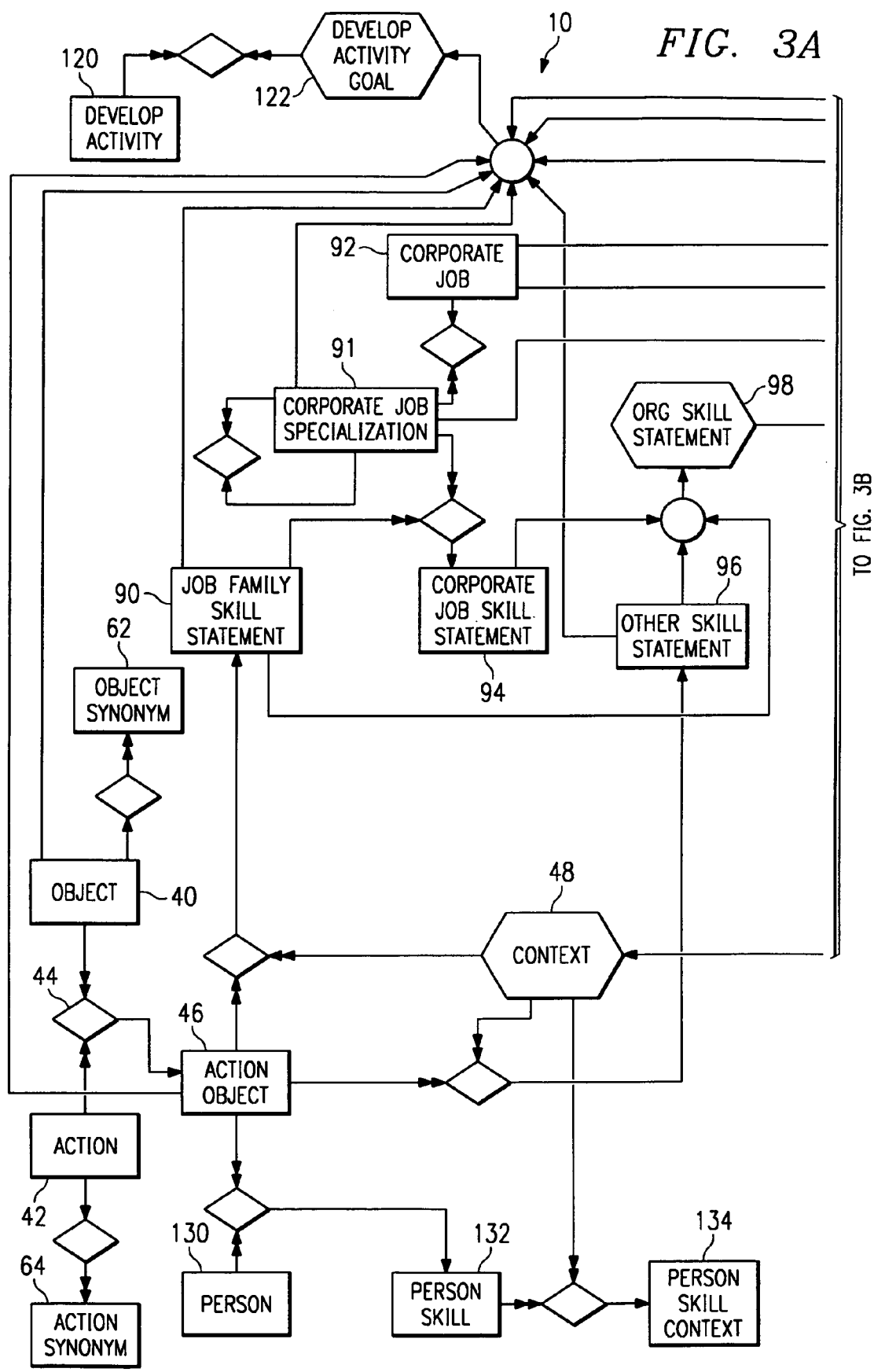
FIGS. 3A and 3B show a more detailed entity/relationship data model of a skills model constructed according to the teachings of the present invention.
Figure 3B:
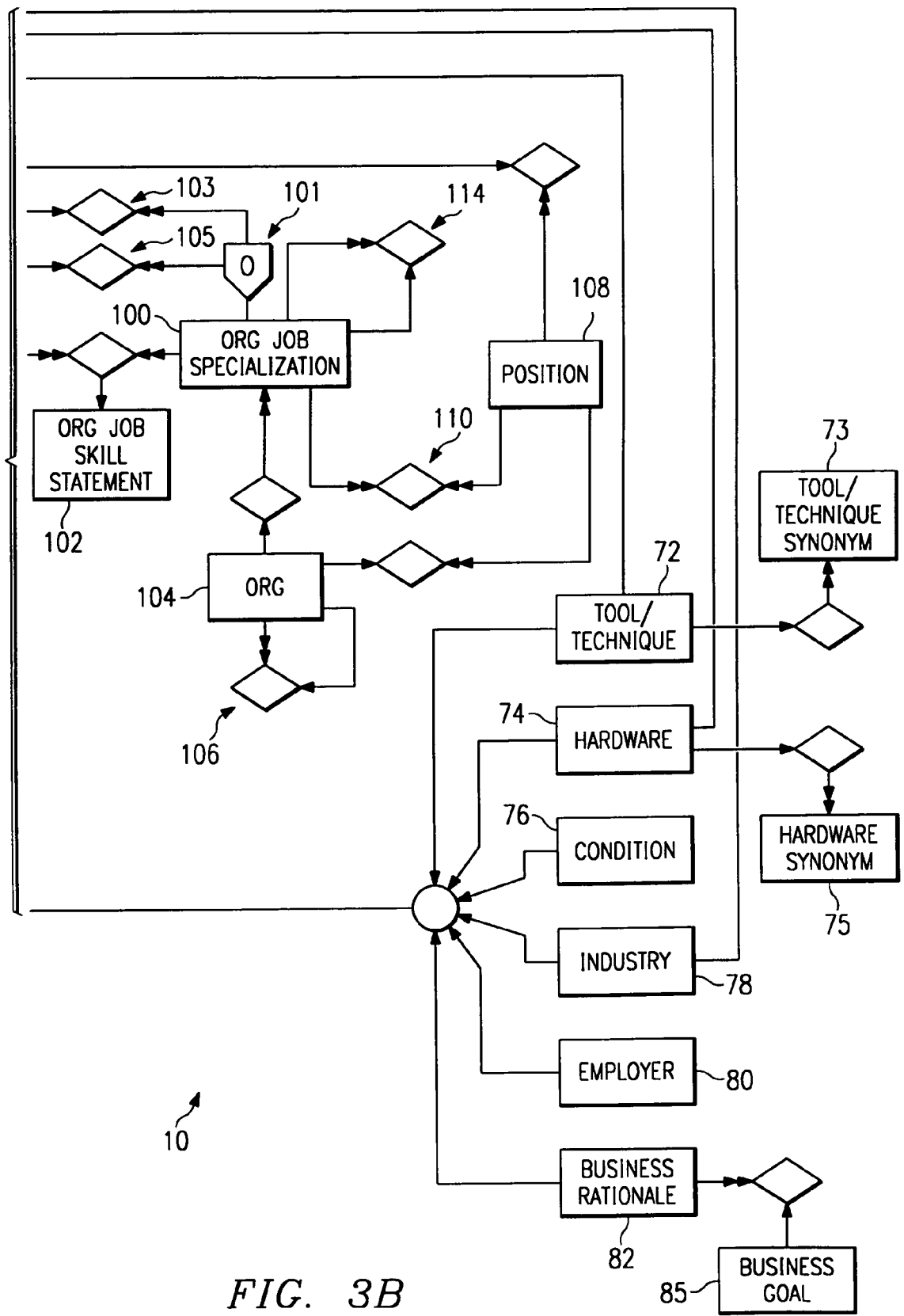

FIGS. 3A and 3B show a more detailed entity/relationship diagram or data model describing a skills model 10. As described above in conjunction with FIG. 2, skills model 10 also includes an Object entity 40, an Action entity 42, an Action-Object entity 46, and a Context entity 48, which form the core of the skills model. Object entity 40 is further augmented by an Object Synonym entity 62, which includes one or more synonymous terms referring to the same deliverable. Similarly, Action entity 42 is related to an Action Synonym entity 64, which includes one or more terms which mean the same as the action. Object and Action Synonym entities 62 and 64 assist the user in finding the common language used for skills in the corporation, and further facilitate relating these skills to the marketplace.

As shown in FIGS. 3A and 3B, Context entity 48 is a collection of a number of modifiers that provide additional contextual information about the skill. Context entity 48 may include a Tool/Technique entity 72, a Hardware entity 74, a Condition entity 76, an Industry entity 78, a Past Employer entity 80, and a Business Rationale entity 82. Examples of Tool/Technique 72 include UNIX®, Microsoft® C++, Borland® C++, Microsoft Project®, Microsoft Windows®, object technology, etc. Tool/Technique entity 72 may also include a Tool/Technique Synonym entity 73 which provides a list of terms referring to the same tools and techniques.

Similarly, Hardware entity 74 may include systems such as 3COM®, DEC®, Intel®, etc, and a list of synonyms is also provided by a Hardware Synonym entity 75. Condition entity 76 provides a context of the circumstance or environment in which the skill is used. For example, Condition entity 76 may indicate the resulting product is for internal or external usage, system-wide or enterprise-wide application, and whether the action was performed with or without direction.

In addition, Industry entity 78 provides the industry backdrop for the skill. This context is important to highlight since performing the same task in one industry, for example software programming, may have very little similarity with performing the same task in another industry. An Employer entity 80 is further provided to pinpoint the corporate environment in which the skill was used. Employer entity 80 can be a current or past employer. A Business Rationale entity 82 further provides the reason why the skill is desirable, which is related to a Business Goal 85 that provides the corporate motivation for possessing and using the skill. With contextual information collected in context 48, the skill or Action-Object 46 is not presented in a vacuum, but grounded in data that facilitate its evaluation.

Continuing to refer to FIGS. 3A and 3B, Action-Object 46 used in a selection of Context 48 yields a Job Family Skill Statement entity 90, which is defined as a particular combination of action-object and contexts. These combinations are identified as important at the corporate level. For example, Job Family Skill Statement 90 may specify the ability to construct data models under the condition of little or no direction. Job Family Skill Statements 90 describe performance required on the job. A Corporate Job 92 may have many Corporate Job Specializations 91. Job Family Skill Statements 90 are grouped into Corporate Job Specializations 91, and Corporate Job Specializations 91 are grouped into Corporate Jobs 92. As indicated by the double arrows leading from Corporate Job Specialization 91 and Job Family Skill Statement 90 to the diamond yielding Corporate Job Skill Statement 94, a Job Family Skill Statement 90 may be required by many Corporate Job Specializations 91 since a skill may be required by more than one job, and a Corporate Job Specialization 91 may require many Job Family Skill Statements 90 to iterate all the skills associated with the job. Therefore, Corporate Job Skill Statement entity 94 holds all pairings of Corporate Job Specialization 91 and Job Family Skill Statement 90 that a corporation believes are important. Corporate Job Skill Statement 94 also indirectly holds all pairings of the Corporate Job 92 and Job Family Skill Statement 90.

Similarly, Other Skill Statement 96 is a list of combinations of Action-Object 46 and Context 48 that has been defined by entities other than the corporation, such as business units or organizations within the corporation.

Following are two examples of when Other Skill Statement 96 would be used:

A Job Family Skill Statement 90 describes performance required on the job, but there may be related performances required to achieve that performance. So, training organizations will need to identify those intermediate performances that a development activity imparts. For example, a Job Family Skill Statement 90 for Senior Systems Engineer is "construct an entity relationship diagram to analyze business information." A training organization may need a skill statement "read an entity relationship diagram to understand business information" in order to describe the performance targeted by a development activity.

A Job Family Skill Statement 90 describes the "typical" skills required by a job. A business unit may have employees performing additional skills for the unit's specialized business or methods. For example, a business unit may need skill statements for developing expert systems. Job Family Skill Statements 90 and Other Skill Statements 96 are collected into a comprehensive Skill Statement 98 list.

As stated above, Job Family Skill Statements 90 are grouped into Corporate Job Specializations 91, and Corporate Job Specializations 91 are grouped into Corporate Jobs 92. A business unit may create an Organization Job Specialization 100 either as a variation on a Corporate Job Specialization 91 or as a completely new specialization.

Although Organization Job Specialization 100 is not defined at the corporate level, it may be assigned a corporate-defined job code. If Organization Job Specialization 100 is derived (relation 105) from a Corporate Job Specialization 91, it is assigned the same job code as Corporate Job Specialization 91 it is derived from. If Organization Job Specialization 100 is a completely new specialization, it is associated (relation 103) with a Corporate Job based on comparing the associated Organization Job Skill Statements 102 and Corporate Job Skill Statements 94 to find the closest match. Organization Job Specialization 100 is in turn defined by Organization 104, which may be a parent organization of one or more sub-organizations, and so on, as indicated by relationship link 106. Human Resource planning activities occur at many levels of an organization. Each organization should be able to utilize existing Organization Skill Statements 98 regardless of who created them. When describing Positions 108 in its organization, a business unit will give preference to Organization Skill Statements 98 and job specializations created by other units in its parent chain or group. A job Position entity 108, to be filled by a person, may require the performance of tasks specified in one or more Organization Job Specializations 100, as indicated by relationship link 110. Even when the person filling Position 108 may be required to perform the tasks of more than one job, the position is still coded with a single job code, as indicated by link 112. For example, a particular position may require the performance of designing system architecture as well as coding the software, but the position is still coded with a Corporate Job appropriate for a system architect because that is the primary responsibility of the position. A further relationship link 114 indicates that an Organization Job Specialization 100 may inherit some skill statements from its parent organization, where some specializations may share a substantial number of similar characteristics.

Employee development and training, be it a course, a specific job assignment, or written materials, is defined by a Development Activity entity 120. Development Activity entity 120 teaches what is collected in a Development Activity Goal entity 120, defined as a collection of one or more entities that may include Object 40, Action-Object 46, Job Family Skill Statement 90, Other Skill Statement 96, Tool/Technique 72, Hardware 74, and Industry 78. Therefore, a goal of one developmental activity may be to teach about data models (Object 40), how to construct a data model using Borland C++® (Object 40 and Tool/Technique 72), or a skill defined in a corporate job as related to a specific industry (Job Family Skill Statement 90 and Industry 78). Constructed in this manner, employee development activities relevant to what is desired or required in the corporation and organization may be designed and indexed for easy identification by an employee seeking development.

A person, having a specific identity such as a name or employee number, is represented by a Person entity 130. Specific persons are associated with action-objects to yield a Person Skill entity 132, which provides an inventory of each employee's skills. Person Skill 132 may also include the begin and end dates associated with each skill, and an indication of whether each skill is acquired through on-the-job experience or education or training only. Person Skill 132 used in a specific Context 48 yields a Person Skill Context entity 134, which further provides a contextual background for the skill inventory of each employee.

Accordingly, the skills model constructed as shown in FIGS. 3A and 3B may be applied to many areas in a business organization. For example, a corporation may use the skills model to study its definition of jobs (Corporate Job 92 and Corporate Job Specialization 91) to see if the definition needs to be updated. When there is an abundance of Organization Jobs Specialization 100 with associated Organization Job Skill Statements 102 that do not closely mesh with Corporate Job 92, Corporate Job Specialization 91, and Corporate Job Skill Statement 94, some revision and update may be necessary in order to provide a more realistic job division and skill assignment in the corporation.

Another use of skills model 10 includes maintaining a database of employees' skills in the form of Person Skill 132 or Person Skill Context 134. Such a skills inventory may be used to facilitate corporate functions such as project staffing and workforce planning and resourcing. The skills inventory may also be used to evaluate each employee to determine compensation, review performance, and recommend training courses or materials (Development Activity 120).

A primary advantage of skills model 10 is to provide a consistent definition of skills for all corporate organizations and applications. The skills model provides a corporation the capability to effectively manage its people resources by highlighting the skills they possess in concrete terms. The skill statements may be maintained and organized in databases or in any other format that may be easily searched and the data accessed.

Although the present invention and its advantages have been described in detail, it should be understood that various changes, substitutions and alterations can be made therein without departing from the spirit and scope of the invention as defined by the appended claims.

What is claimed is:

1. A computer-implemented method for data modeling a skill, comprising the steps of:
    defining, in a computer-readable medium, an object representing a subject matter of one or more skills;
    defining, in the computer-readable medium, at least one action, each action representing an activity of one or more skills;
    electronically interrelating the object and one of the actions to create a skill model data structure; and
    defining, in the computer-readable medium, at least one context, each context associated with the skill model to create a skill-context combination and representing a modifier of the skill associated with the skill model.

2. The method, as set forth in claim 1, further comprising the step of defining, in the computer-readable medium, a list of object synonyms and linking said list of object synonyms to said defined object.

3. The method, as set forth in claim 1, further comprising the step of defining, in the computer-readable medium, a list of action synonyms and linking said list of action synonyms to one of the defined actions.

4. The method, as set forth in claim 1, wherein the context definition step further comprises the step of defining, in the computer-readable medium, a tool or technique used by the skill.

5. The method, as set forth in claim 4, further comprising the step of defining, in the computer-readable medium, a list of tool and technique synonyms and linking said list of tool and technique synonyms to said defined tool and technique.

6. The method, as set forth in claim 1, wherein the context definition step further comprises the step of defining, in the computer-readable medium, a hardware environment for the skill.

7. The method, as set forth in claim 6, further comprising the step of defining, in the computer-readable medium, a list of hardware synonyms and linking said list of hardware synonyms to said defined hardware.

8. The method, as set forth in claim 1, wherein the context definition step further comprises the step of defining, in the computer-readable medium, a condition under which the skill is carried out.

9. The method, as set forth in claim 1, wherein the context definition step further comprises the step of defining, in the computer-readable medium, an industry background for the skill.

10. The method, as set forth in claim 1, wherein the context definition step further comprises the step of defining, in the computer-readable medium, current or past employer.

11. The method, as set forth in claim 1, wherein the context definition step further comprises the step of defining, in the computer-readable medium, a business rationale for using the skill.

12. The method, as set forth in claim 11, further comprising the step of defining, in the computer-readable medium, a business goal attainable as a result of said defined business rationale.

13. The method, as set forth in claim 1, further comprising the step of defining an action-object entity which is the combination of said associated action and object.

14. The method, as set forth in claim 1, further comprising the steps of:
   defining, in the computer-readable medium, at least one corporate job;
   defining, in the computer-readable medium, at least one corporate job specialization; and
   defining, in the computer-readable medium, a corporate job skill statement using one of the skill-context combinations needed to perform said at least one corporate job specialization.

15. The method, as set forth in claim 1, further comprising the steps of:
   defining, in the computer-readable medium, at least one organization job specialization; and
   defining, in the computer-readable medium, an organization job skill statement using one of the skill-context combinations needed to perform said at least one organization job specialization.

16. The method, as set forth in claim 1, further comprising the steps of:
   defining, in the computer-readable medium, at least one corporate job;
   defining, in the computer-readable medium, at least one corporate job specialization;
   defining and specifying, in the computer-readable medium, a corporate job skill statement using a first of the skill-context combinations needed to perform said at least one corporate job specialization;
   defining, in the computer-readable medium, at least one organization job specialization; and
   defining and specifying, in the computer-readable medium, an organization job skill statement using a second of the skill-context combinations needed to perform said at least one organization job specialization.

17. The method, as set forth in claim 16, further comprising the step of linking a position to said at least one defined organization job specialization and to said at least one corporate job.

18. The method, as set forth in claim 17, further comprising the step of linking said at least one defined organization job specializations to levels in corporate organizational hierarchy and matching said at least one defined organization job specializations to corporate jobs and corporate job specializations.

19. The method, as set forth in claim 1, further comprising the step of:
   specifying, in the computer-readable medium, an identity of an employee; and
   defining, in the computer-readable medium, a person skill statement using the skill model, the associated skill capable of being performed by said specified employee.

20. The method, as set forth in claim 1, further comprising the steps of:
   specifying, in the computer-readable medium, the identity of an employee;
   defining, in the computer-readable medium, a person skill statement using the skill model, the associated skill capable of being performed by said specified employee; and
   defining, in the computer-readable medium, a context for how the skills in said person skill statement are performed.

21. The method, as set forth in claim 19, further comprising the step of further specifying, in the computer-readable medium, a begin and end date for performing said skill.

22. The method, as set forth in claim 19, further comprising the step of further specifying, in the computer-readable medium, whether said skill is acquired through education only.

23. A computer-readable medium storing a skills model, the skills model comprising:
   a definition of at least one object representing a subject matter of one or more skills;
   a definition of at least one action, each action representing an activity of one or more skills;
   an electronic interrelationship of the object and one of the actions to create a skill model data structure; and
   a definition of at least one context, each context associated with the skill model to create a skill-context combination and representing a modifier of the skill associated with the skill model.

24. The computer-readable medium, as set forth in claim 23, further comprising a definition of a list of object synonyms linked to said defined object.

25. The computer-readable medium, as set forth in claim 23, further comprising a definition of a list of action synonyms linked to one of the defined actions.

26. The computer-readable medium, as set forth in claim 23, wherein the context definition further comprises a definition of a tool or technique used by one of the skills.

27. The computer-readable medium, as set forth in claim 26, further comprising a definition of a list of tool and technique synonyms linked to said defined tool and technique.

28. The computer-readable medium, as set forth in claim 23, wherein the context definition further comprises a definition of a hardware environment for one of the skills.

29. The computer-readable medium, as set forth in claim 28, further comprising a definition of a list of hardware synonyms linked to said defined hardware.

30. The computer-readable medium, as set forth in claim 23, wherein the context definition further comprises a definition of a condition under which one of the skills is carried out.

31. The computer-readable medium, as set forth in claim 23, wherein the context definition further comprises a definition of an industry background for one of the skills.

32. The computer-readable medium, as set forth in claim 23, wherein the context definition further comprises a definition of current and/or or past employer.

33. The computer-readable medium, as set forth in claim 23, wherein the context definition further comprises a definition of a business rationale for using one of the skills stored in memory.

34. The computer-readable medium, as set forth in claim 33, further comprising a definition of a business goal attainable as a result of said defined business rationale.

35. The computer-readable medium, as set forth in claim 23, further comprising a definition of an action-object entity, which is a combination of said defined action and object.

36. The computer-readable medium, as set forth in claim 23, further comprising:
  a definition of at least one corporate job;
  a definition of at least one corporate job specialization; and
  a definition of a corporate job skill statement using one of the skill-context combinations needed to perform said at least one corporate job specialization.

37. The computer-readable medium, as set forth in claim 23, further comprising:
  a definition of at least one organization job specialization; and
  a definition of an organization job skill statement using one of the skill-context combinations needed to perform said at least one organization job specialization.

38. The computer-readable medium, as set forth in claim 23, further comprising the steps of:
  a definition of at least one corporate job;
  a definition of at least one corporate job specialization;
  a definition of a corporate job skill statement using a first of the skill-context combinations needed to perform said at least one corporate job specialization;
  a definition of at least one organization job specialization; and
  a definition of an organization job skill statement using a second of the skill-context combinations needed to perform said at least one organization job specialization.

39. The computer-readable medium, as set forth in claim 38, further comprising a definition of a position coupled to said at least one defined organization job specialization and to a corporate job.

40. The computer-readable medium, as set forth in claim 39, further comprising:
  a corporate organizational hierarchy having levels linked to said at least one defined organization job specializations; and
  said at least one defined organization job specializations being matched to said corporate jobs and corporate job specializations.

41. The computer-readable medium, as set forth in claim 23, further comprising:
  an identity of at least one employee; and
  a definition of a person skill statement using the skill model, each associated skill capable of being performed by said employee.

42. The computer-readable medium, as set forth in claim 23, further comprising:
  an identity of at least one employee;
  a definition of a person skill statement using the skill model, each associated skill capable of being performed by said employee; and
  a definition of a context for how each of the skills in said person skill statement is performed.

43. The computer-readable medium, as set forth in claim 41, further comprising a begin and end date for performing said skill of said person skill statement.

44. The computer-readable medium, as set forth in claim 41, further comprising an indication of whether said skill of said person skill statement describes a skill acquired through education only.

45. A skills model database embodied in a computer-readable medium, comprising:
  an object entity representing a subject matter of one or more skills;
  a plurality of action entities, each action entity representing an activity of one or more skills;
  an electronic relationship associating the object entity and one of the action entities to create a skill model data structure; and
  at least one context entity for the skill model, each context entity representing a modifier of the skill associated with the skill model.

46. The skills model database, as set forth in claim 45, wherein said context entity includes a combination of:
  a tool/technique may be used by said action entity to arrive at said object entity;
  a hardware on which said action entity may be performed to arrive at said object entity;
  a condition in which said action entity may be performed;
  an industry in which said action entity may be performed;
  a current and/or past employer for which said action entity may have been performed; and
  a business rationale for performing said action entity to achieve said object entity.

47. The skills model database, as set forth in claim 45, wherein a combination of the skill model and the context entity yields a corporate job skill statement associated with a job code.

48. The skills model database, as set forth in claim 45, wherein a combination of the skill model and the context entity yields an organization job skill statement associated with an organization job and at least one position.

49. The skills model database, as set forth in claim 45, wherein a combination of the skill model and the context entity yields a person job skill context associated with an identifiable employee.

50. The skills model database, as set forth in claim 45, wherein the skill model yields a person job skill statement associated with an identifiable employee.

51. The skills model database, as set forth in claim 45, further comprising an object synonym linked to said object entity.

52. The skills model database, as set forth in claim 45, further comprising an action synonym linked to said action entity.

* * * * *